(12) United States Patent
Zheng

(10) Patent No.: US 9,727,089 B2
(45) Date of Patent: Aug. 8, 2017

(54) ELECTRONIC DEVICE

(71) Applicant: Lenovo (Beijing) Co., Ltd., Beijing (CN)

(72) Inventor: Yimin Zheng, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 170 days.

(21) Appl. No.: 14/181,072

(22) Filed: Feb. 14, 2014

(65) Prior Publication Data
US 2015/0055285 A1   Feb. 26, 2015

(30) Foreign Application Priority Data

Aug. 21, 2013  (CN) .......................... 2013 2 0513073
Aug. 21, 2013  (CN) .......................... 2013 2 0513084
Aug. 21, 2013  (CN) .......................... 2013 2 0513386

(51) Int. Cl.
*G06F 1/16*  (2006.01)

(52) U.S. Cl.
CPC ............ *G06F 1/1656* (2013.01); *G06F 1/166* (2013.01); *G06F 1/1626* (2013.01)

(58) Field of Classification Search
None
See application file for complete search history.

(56) References Cited

U.S. PATENT DOCUMENTS

| 5,100,098 A | * | 3/1992 | Hawkins | ............... F16M 11/041 |
| | | | | 16/339 |
| 5,375,076 A | * | 12/1994 | Goodrich | ............... G06F 1/1626 |
| | | | | 361/679.17 |
| 5,675,524 A | * | 10/1997 | Bernard | ................ G06F 1/1626 |
| | | | | 361/679.41 |
| 5,682,182 A | * | 10/1997 | Tsubosaka | ........ G02F 1/133308 |
| | | | | 345/173 |
| 5,737,183 A | * | 4/1998 | Kobayashi | ............ G06F 1/1626 |
| | | | | 16/366 |
| 6,002,581 A | * | 12/1999 | Lindsey | ................ G06F 1/1616 |
| | | | | 312/223.2 |

(Continued)

FOREIGN PATENT DOCUMENTS

| CN | 101109975 A | 1/2008 |
| CN | 201247421 Y | 5/2009 |

(Continued)

*Primary Examiner* — Courtney Smith
*Assistant Examiner* — Rashen E Morrison
(74) *Attorney, Agent, or Firm* — Harness, Dickey & Pierce, P.L.C.

(57) ABSTRACT

An electronic device according to the present application includes a main body and a display unit, the main body includes a first side portion and a second side portion, the second side portion is a side portion opposite to the first side portion, a thickness of the main body has a tendency of being smaller in a direction from the first side portion to the second side portion; the display unit is provided on a first surface of the main body, a first groove is provided on a second surface of the main body to form an accommodating space. The accommodating space is adapted to accommodate auxiliary tools, therefore the electronic device may provide the accommodating space for the auxiliary tools by itself, and it is more convenient for users to use the electronic device.

23 Claims, 17 Drawing Sheets

(56) References Cited

U.S. PATENT DOCUMENTS

| | | | | |
|---|---|---|---|---|
| 6,636,204 B2* | 10/2003 | Santoh | ............... | G06F 1/1616 |
| | | | | 345/169 |
| 7,206,198 B2* | 4/2007 | Wang | ............... | G06F 1/166 |
| | | | | 312/223.1 |
| 7,502,222 B2* | 3/2009 | Cheng | ............... | G06F 1/1613 |
| | | | | 361/679.06 |
| 8,213,168 B2* | 7/2012 | McClure | ............... | G06F 1/1613 |
| | | | | 206/545 |
| 8,289,688 B2* | 10/2012 | Behar | ............... | G06F 1/162 |
| | | | | 361/679.27 |
| 8,648,821 B2* | 2/2014 | Wu | ............... | G06F 1/1601 |
| | | | | 345/173 |
| 8,824,134 B2 | 9/2014 | Chu et al. | | |
| 9,164,541 B2* | 10/2015 | Chen | ............... | G06F 1/1622 |
| 2005/0052831 A1* | 3/2005 | Chen | ............... | G06F 1/1616 |
| | | | | 361/679.11 |
| 2006/0109617 A1* | 5/2006 | Chen | ............... | G06F 1/1626 |
| | | | | 361/679.55 |
| 2008/0068786 A1* | 3/2008 | Cheng | ............... | G06F 1/1613 |
| | | | | 361/679.01 |
| 2009/0244832 A1* | 10/2009 | Behar | ............... | G06F 1/162 |
| | | | | 361/679.55 |
| 2011/0164370 A1 | 7/2011 | McClure et al. | | |
| 2012/0044123 A1 | 2/2012 | Rothkopf et al. | | |
| 2012/0106047 A1* | 5/2012 | Chu | ............... | G06F 1/166 |
| | | | | 361/679.01 |
| 2012/0268880 A1* | 10/2012 | Tomita | ............... | G06F 1/1616 |
| | | | | 361/679.09 |
| 2013/0107427 A1* | 5/2013 | Cheng | ............... | G06F 1/1626 |
| | | | | 361/679.01 |
| 2013/0176681 A1* | 7/2013 | Lee | ............... | G06F 1/1626 |
| | | | | 361/679.55 |

FOREIGN PATENT DOCUMENTS

| | | |
|---|---|---|
| CN | 101715276 A | 5/2010 |
| CN | 201853163 U | 6/2011 |
| CN | 102117104 A | 7/2011 |
| CN | 102123561 A | 7/2011 |
| CN | 102147999 A | 8/2011 |
| CN | 202025248 U | 11/2011 |
| CN | 102446015 A | 5/2012 |
| CN | 102447175 A | 5/2012 |
| CN | 102467171 A | 5/2012 |
| CN | 202267894 U | 6/2012 |
| CN | 202647104 U | 1/2013 |
| CN | 202939541 U | 5/2013 |
| CN | 103207646 A | 7/2013 |
| CN | 203070149 U | 7/2013 |

\* cited by examiner

ELECTRONIC DEVICE

This application claims the benefit of priorities to Chinese patent application No. 201320513386.7 titled "ELECTRONIC DEVICE" and filed with the Chinese State Intellectual Property Office on Aug. 21, 2013, Chinese patent application No. 201320513073.1 titled "ELECTRONIC DEVICE" and filed with the Chinese State Intellectual Property Office on Aug. 21, 2013, and Chinese patent application No. 201320513084.X titled "ELECTRONIC DEVICE" and filed with the Chinese State Intellectual Property Office on Aug. 21, 2013, the entire disclosures of which are incorporated herein by reference.

TECHNICAL FIELD

The present application relates to the technical field of electronic technology and, more specifically, relates to an electronic device.

BACKGROUND

With the development of the electronic devices, the users has higher and higher requirements for the portability and functionality of the electronic devices, for example, the electronic devices, such as mobile phones, laptops, flat panel computers, has lighter, thinner and smaller structures, and also has more functions.

For meeting the requirements on the convenience of the electronic device, some manufacturers provide corresponding auxiliary tools matching with certain functions of the electronic device. Taking the flat panel computer as example, a handwriting pen is provided for a touch sensing function, and a smart card is provided for an extended function. With the increase of the functions of the electronic device, the number of the auxiliary tools is increased, and most of the auxiliary tools have a small size, thus in some specific situations, for example, when a user goes out, the user needs to carry an additional bag to accommodate these auxiliary tools.

Since an additional bag is required to be carried to accommodate the auxiliary tools of the electronic device, such as the handwriting pen, and the smart card, the auxiliary tools tend to be lost by the users in using process, which brings a lot of inconveniences for the user. Thus, the electronic device in the prior art is short of accommodating space for accommodating the auxiliary tools.

In the prior art, even if a few of electronic devices are provided with the accommodating space for accommodating the auxiliary tools, the built-in space for hardware of the electronic device becomes smaller and the design of the built-in space becomes more compact with the electronic device becomes smaller and thinner, thus the capacity and volume of the accommodating space is very limited, and the accommodating space is generally for a single-type tool, for example, a groove is provided on a side edge of the phone case for accommodating the handwriting pen. Thus, in the prior art, the accommodating space of the electronic device having the accommodating space has a limited capacity and is only used for accommodating a single-type auxiliary tool.

Additionally, in the prior art, for a few of electronic devices having the groove, the groove is generally a universal groove, and the auxiliary tool can not be fixed when being placing in the groove, thus the auxiliary tool may move along with the electronic device being shook during use, which may cause noise and cause damage to the auxiliary tools and an inner wall of the groove. Thus in the prior art, the auxiliary tools placed in the groove of the electronic device having the groove can not be fixed.

SUMMARY OF THE INVENTION

The present application provides an electronic device, which solves a technical problem that the electronic device in the prior art is short of accommodating space for accommodating auxiliary tools, and achieves a technical effect that the electronic device may provide the accommodating space for accommodating auxiliary tools by itself, thereby facilitating using the electronic device for users.

The electronic device according to the embodiments of the present application includes:

a main body including a first side portion and a second side portion, the second side portion being a side portion opposite to the first side portion, and a thickness of the main body having a tendency of being smaller in a direction from the first side portion to the second side portion; and a display unit arranged on a first surface of the main body; wherein a first groove is arranged on a second surface of the main body to form an accommodating space.

Preferably, the electronic device further includes a supporting plate movable with respect to the main body.

Preferably, the first groove is adapted to accommodate the supporting plate.

Preferably, the accommodating space is adapted to accommodate a smart card for communication or storage and/or a handwriting pen.

Preferably, the first groove is provided with a second groove, and the second groove is adapted to accommodate a smart card for communication or storage and/or a handwriting pen.

Preferably, the second groove has a first shape matching with a second shape of the smart card to be accommodated and/or a third shape of the handwriting pen to be accommodated.

Preferably, the accommodating space is adapted to accommodate a power source of the electronic device.

Preferably, a bottom of the first groove is provided with a cover plate, a first side edge of the cover plate is provided with a connecting member, the connecting member is an elastomer, and the cover plate is connected to the bottom of the first groove via the connecting member;

wherein, the cover plate is movable with respect to the bottom of the first groove by taking the connecting member as a shaft, and in a case that the cover plate moves to be close to the bottom of the first groove, a card-shaped auxiliary tool is fixed by the cover plate.

Preferably, the first side portion is provided with M input/output members, and M is a positive integer.

Preferably, the M input/output members are arranged on an end portion of the first side portion.

Preferably, the end portion of the first side portion includes a first end portion and a second end portion, and the M input/output members are arranged on an outer surface of the first end portion and/or an outer surface of the second end portion.

Preferably, a first input/output member of the M input/output members has the same center as the first end portion and/or the second end portion.

Preferably, the first input/output member has a shape same as the outer surface of the first end portion, and/or, the first input/output member has a shape same as the outer surface of the second end portion.

Preferably, an angle is formed between the outer surface of the first end portion and a first side surface of the main body.

Preferably, the angle is greater than a threshold, and the outer surfaces of the first end portion and the second end portion and the second surface of the main body are configured to be observed by a user at the same time, wherein, the second surface is opposite to the first surface of the main body. In other words, a thickness of the first side portion decreases in a direction from the first surface to the second surface to permit the outer surface of the first end portion, the outer surface of the second end portion, and the second surface of the main body to be observed by a user at the same time.

Preferably, the electronic device further includes a supporting member, wherein the supporting member includes a connecting member, and the supporting member is arranged at the first side portion.

Preferably, the electronic device further includes N input/output members, and the N input/output members are arranged on an end surface of the connecting member, or on a first surface of the first side portion.

Preferably, the supporting member further includes a supporting plate, the supporting plate is movable with respect to the main body via the connecting member, and the supporting body is adapted to support the main body in a case that the supporting plate moves to a first relative position with respect to the main body.

Preferably, the M input/output members are any one or various combinations of a button, an indicating lamp, a loudspeaker, a camera and a periphery interface.

Preferably, the first side portion and the main body have the same center of gravity.

Preferably, at least one first functional component is arranged inside the main body, and the at least one first functional component is arranged at a position close to the first side portion, and the thickness of the main body has the tendency of being smaller in a direction from the first side portion to the second side portion.

Preferably, the electronic device further includes a shaft, and a supporting plate adapted to support the main body, wherein, a mounting hole is provided on a first side edge of the supporting plate, and the supporting plate is connected to the shaft via the mounting hole.

Preferably, the supporting plate is movable with respect to the shaft.

Preferably, at least one surface of the supporting plate is a curved surface.

Preferably, the shaft is arranged on the first side portion of the main body.

Preferably, a value of an inner diameter of the mounting hole is a first value, a value of a diameter of the shaft is a second value, and the first value is greater than or equal to the second value.

Preferably, the electronic device further includes a damping structure provided on the shaft.

The electronic device according to the embodiments of the present application may be a flat panel device, such as a flat panel computer, a smart phone, or a multimedia player. The electronic device includes a main body and a display unit, the main body includes a first side portion and a second side portion, and the second side portion is a side portion opposite to the first side portion. A thickness of the main body has a tendency of being smaller in a direction from the first side portion to the second side portion. The display unit is arranged on a first surface of the main body, and a second surface of the main body is provided with a first groove for forming an accommodating space to accommodate auxiliary tools. Therefore, a technical problem that the electronic device in the prior art is short of accommodating space for accommodating auxiliary tools is effectively solved, and a technical effect that the electronic device may provide the accommodating space for accommodating auxiliary tools by itself is realized, thus it is more convenient for users to use the electronic device.

DETAILED DESCRIPTION

Embodiments of the present application provide an electronic device, which may be a flat panel device, such as a flat panel computer, a smart phone, or a multimedia player. The electronic device includes a main body and a display unit, the main body includes a first side portion and a second side portion, and the second side portion is a side portion opposite to the first side portion. A thickness of the main body has a tendency of being smaller in a direction from the first side portion to the second side portion. The display unit is arranged on a first surface of the main body, and a second surface of the main body is provided with a first groove for forming an accommodating space.

In the embodiments of the present application, the accommodating space, formed by the first groove arranged on the second surface of the main body of the electronic device, may be used to accommodate auxiliary tools, which effectively solves a technical problem that the electronic device in the prior art is short of accommodating space for accommodating auxiliary tools, and achieves a technical effect that the electronic device may provide the accommodating space for accommodating auxiliary tools by itself, thus it is more convenient for users to use the electronic device.

The technical solutions of the present application will be described in details in conjunction with drawings and embodiments. It should be noted that, the embodiments of the present application and specific features in the embodiments are used to describe the technical solutions of the present application, and should not be interpreted as limitation to the technical solutions of the present application, and the embodiments of the present application and the technical features in the embodiments may be combined with each other in a case without causing conflicts.

Figure 1:
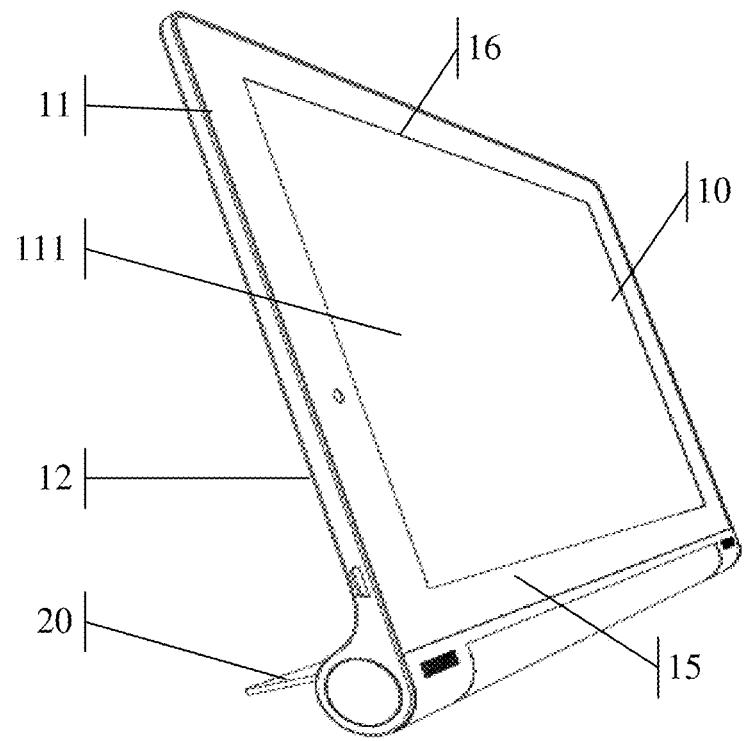
FIGS. 1 and 2 are schematic views showing the structure of an electronic device according to a first embodiment of the present application.
Figure 2:
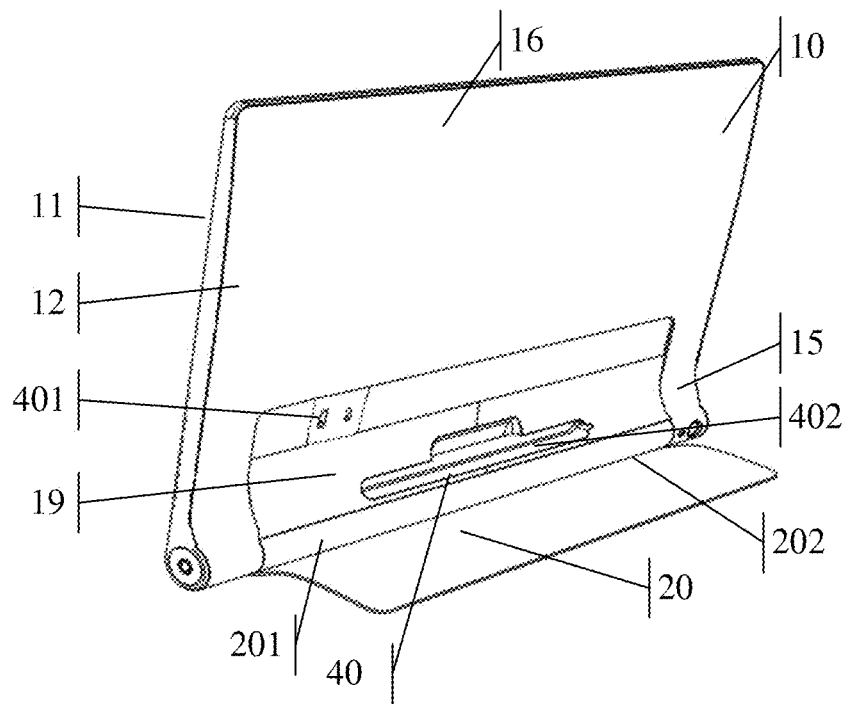

The electronic device according to a first embodiment of the present application, as shown in FIGS. 1 and 2, includes a main body 10 and a display unit 111. The main body 10 includes a first side portion 15 and a second side portion 16 opposite to the first side portion 15. A thickness of the main body 10 has a tendency of being smaller in a direction from the first side portion 15 to the second side portion 16. The display unit 111 is arranged on a first surface 11 of the main body 10, and a second surface 12 of the main body 10 is provided with a first groove 19 for forming an accommodating space.

The accommodating space, formed by the first groove arranged on the second surface of the main body of the electronic device, may be used for accommodating auxiliary tools, thus the electronic device may provide the accommodating space for accommodating auxiliary tools by itself.

Figure 3:
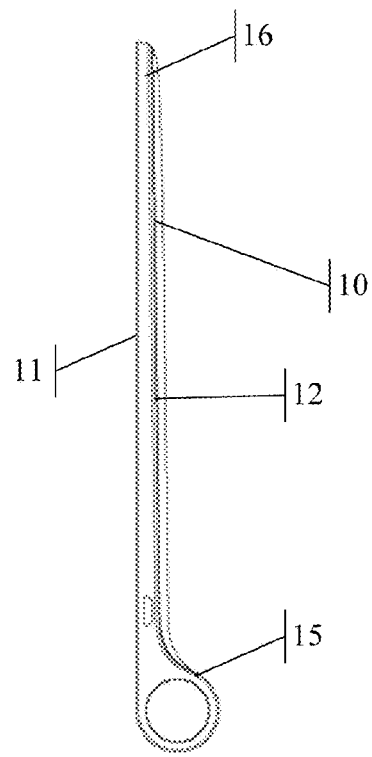
FIGS. 3 and 4 are side views of a main body of the electronic device according to the first embodiment of the present application.
Figure 4:
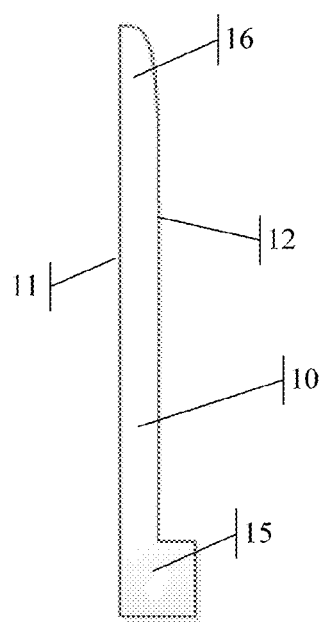

The thickness of the main body 10 has a tendency of being smaller in the direction from the first side portion to the second side portion. For example, referring to FIGS. 3 and 4, which are side views of the electronic device, the tendency of being smaller of the thickness may be realized in a ladder shape with at least one stage, or in an arc shape. A first thickness of the first side potion 15 of the main body 10 is larger than a second thickness of the second side portion 16.

The first groove 19 may be arranged at any positions on the second surface 12 of the main body 10. For making the first groove 19 having a larger capacity, the first groove 19 may be arranged on the second surface 12 at a position corresponding to the first side portion 15 which has a larger thickness. The auxiliary tools accommodated in the accommodating space formed by the first groove 19 may be a handwriting pen for touch sensing, a smart card for storing data or expanding memory, a data cable for uploading and downloading data, a temporary record card, and other auxiliary tools which has a shape matching the first groove 19 and could be accommodated in the first groove 19, which will not be limited herein.

Further, referring to FIG. 2, the electronic device includes a supporting plate 20 which is movable with respect to the main body 10.

One end 202 of the supporting plate 20 is provided with a connecting member 201, and the supporting plate 20 may move with respect to the main body 10 via the connecting member 201. The connecting member 201 may be a rotating shaft, and the supporting plate 20 and the connecting member 201 may be formed integrally, or the supporting plate 20 is sleeved on the connecting member 201. The connecting member 201 may be a damping rotating shaft, thus the supporting plate 20 may be fixedly remained when rotating to a first relative position with respect to the main body 10, thereby achieving supporting the electronic device.

Figure 5:
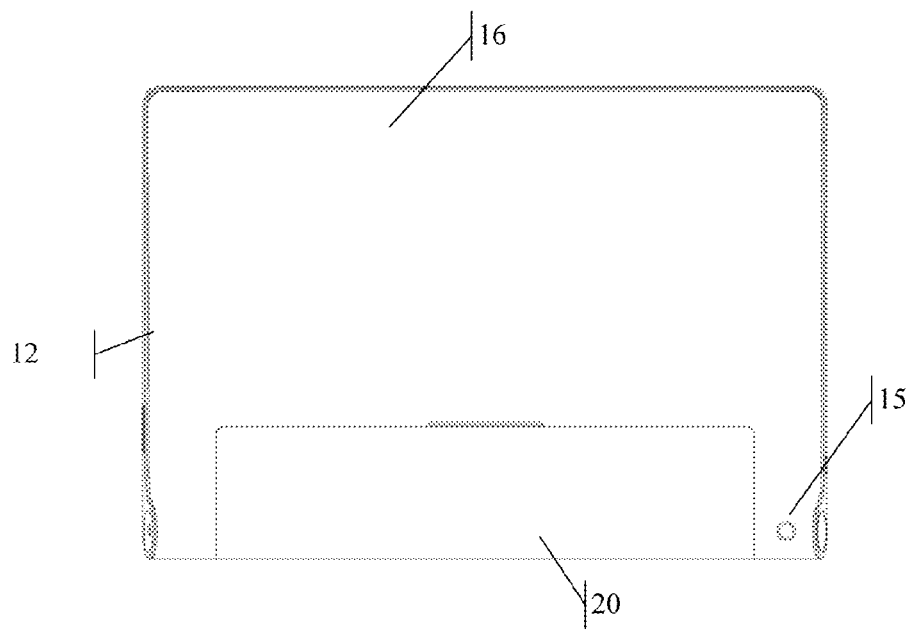
FIG. 5 is a schematic view showing a supporting plate being accommodated in a first groove of the electronic device according to the first embodiment of the present application.

Further, referring to FIG. 5, which shows a status when the supporting plate is accommodated in the first groove, the first groove 19 is able to accommodate the supporting plate 20. Since the supporting plate 20 is movable with respect to the main body 10, the supporting plate 20 may be accommodated in the first groove 19 when the supporting plate 20 moves to be close to the main body 10 and could not be closer to the main body 10.

Referring to FIGS. 2 and 5, at least one surface of the supporting plate 20 is a curved surface. Thus a third shape of a third surface, formed when the supporting plate is accommodated in the first groove, is identical with a second shape of a second surface of the main body. When the supporting plate is accommodated, the integrality of the appearance of the whole electronic device may not be destroyed, and the supporting plate may also function as a groove cover. Certainly, the supporting plate may be in other shapes, which all meet the requirements of the present embodiment as long as the supporting plate could be accommodated in the first groove.

Further, the accommodating space is adapted to accommodate a smart card, and/or a handwriting pen, or the accommodating space is adapted to accommodate a power source of the electronic device, and the power source may be a battery of the electronic device, or a battery charger of the electronic device.

Referring to FIG. 2, a second groove 40 is arranged inside the first groove 19 and is adapted to accommodate the smart card for communication or storage and/or the handwriting pen.

A first shape of the second groove 40 matches with a second shape of the smart card 401 to be accommodated and/or a third shape of the handwriting pen 402 to be accommodated. That is, since the shape of the second groove 40 is designed according to the shape of the smart card and/or the handwriting pen, after the smart card and/or the handwriting pen are placed in the corresponding second groove 40, the smart card and/or the handwriting pen will not move in the second groove 40 when an user shakes the electronic device in using, thereby avoiding noise, and the smart card and/or the handwriting pen will not be lost when the supporting plate 20 is unfolded to support the main body 10, that is, the second groove 40 functions to fix the smart card and/or the handwriting pen.

Additionally, the first groove 19 is provided with M separating plates 41 perpendicular to a bottom of the first groove 19, and the first groove 19 is divided into N first sub-grooves via the separating plates 41. The above structure will be described in detail in conjunction with FIG. 6, which is a structural view showing the first groove provided with sub-grooves.

Figure 6:
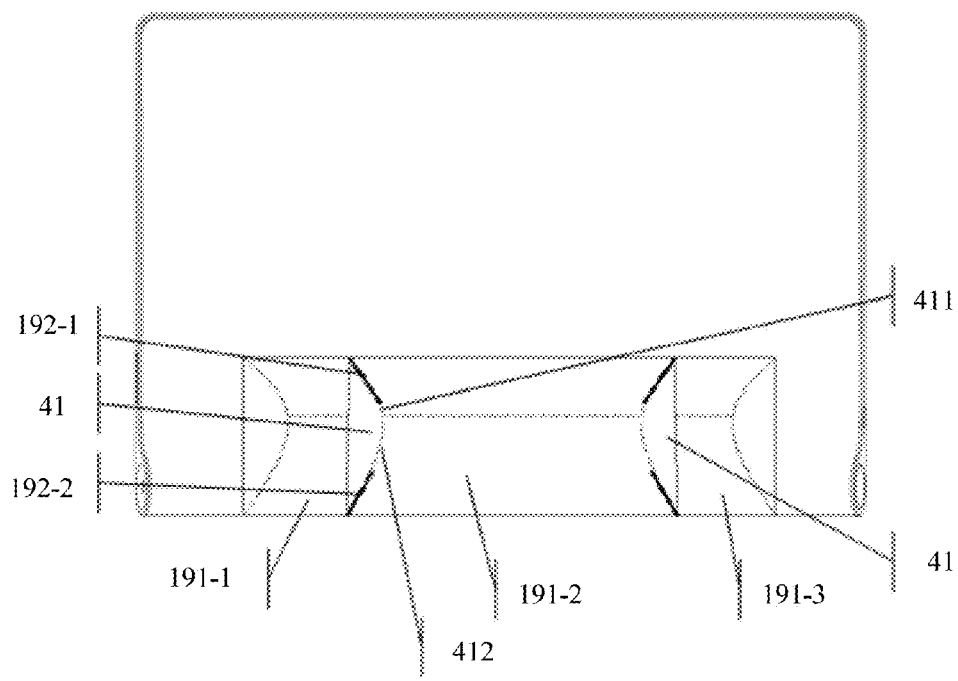
FIG. 6 is a schematic view showing the structure of the first groove, having a sub-groove, of the electronic device according to the first embodiment of the present application.

In FIG. 6, the first groove 19 is divided into three sub-grooves via two separating plates 41, two first sub-grooves at two sides are respectively a first sub-groove 191-1 and a first sub-groove 191-3, and the two first sub-grooves 191-1 and 191-3 are symmetrical with respect to a first sub-groove 191-2 in the middle. The dimensions of the first sub-grooves may be different, and may be designed according to the shapes of the auxiliary tools to be accommodated so as to accommodate the auxiliary tools by categories. For example, the charger of the electronic device may be accommodated in the smaller first sub-groove 191-1 on the left, and a small size external input device or power source may be accommodated in the larger first sub-groove 191-2 in the middle, thereby effectively preventing collision among the auxiliary tools.

Further, when the supporting plate is folded, the supporting plate 20 may be accommodated in an ith first sub-groove 191 of the N first sub-grooves, wherein, i is any integer between 1 and N, and the above structure will be described hereinafter in conjunction with FIGS. 6 and 7.

Figure 7:
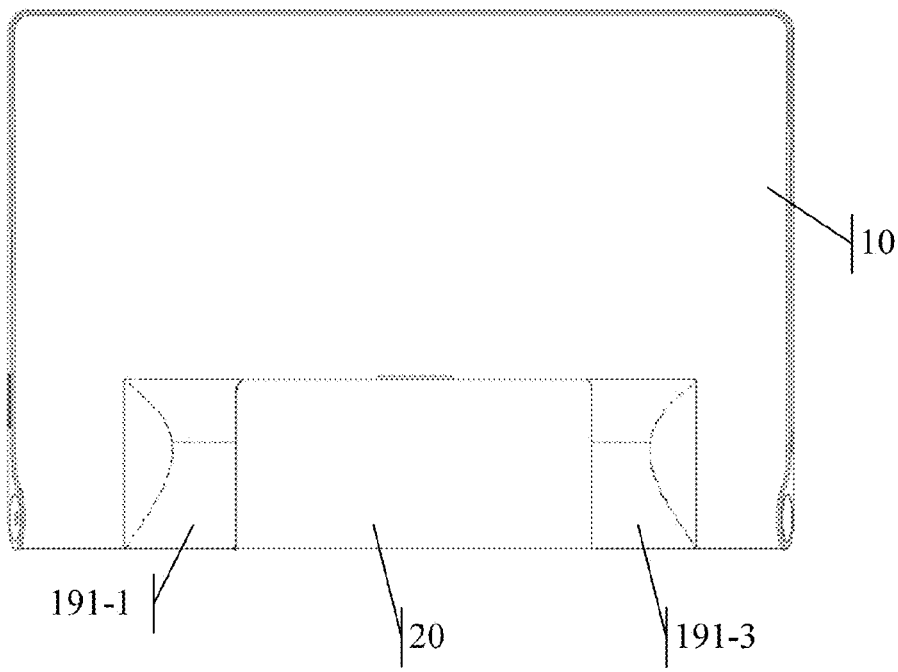
FIG. 7 is a schematic view showing the supporting plate being accommodated in a first sub-groove of the electronic device according to the first embodiment of the present application.

In FIG. 6, the supporting plate 20 is arranged at the first side portion 15 at a position corresponding to the sub-groove 191-2 in the middle, and when the supporting plate 20 moves to be accommodated in the first groove 19, the supporting plate 20 is accommodated in the first sub-groove 191-2 of the first groove 19 as shown in FIG. 7, which is a view showing the supporting member being accommodated in the first sub-groove, which effectively ensures that the supporting plate may be accommodated in the first groove when the dimension of the supporting plate does not match with that of the first groove.

Further, referring to FIG. 6, a sidewall of the first groove 19 is provided with at least one group of a first side groove 192-1 and a second side groove 192-2 which are opposite to each other and perpendicular to a bottom of the first groove 19. The separating plate 41 includes a first end portion 411 and a second end portion 412 opposite to first end portion 411, the first end portion 411 may be inserted into the first side groove 192-1, and the second end portion 412 may be inserted into the second side groove 192-2. That is, the separating plate 41 is mounted flexibly, the separating plate 41 is mounted when the auxiliary tools to be placed has small sizes and need to be separated by categories, and the separating plate 41 may be removed when the auxiliary tools needed to be placed have a larger size, thus users can flexibly arrange the layout of the grooves according to the dimensions of the auxiliary tools to be placed.

Figure 8:
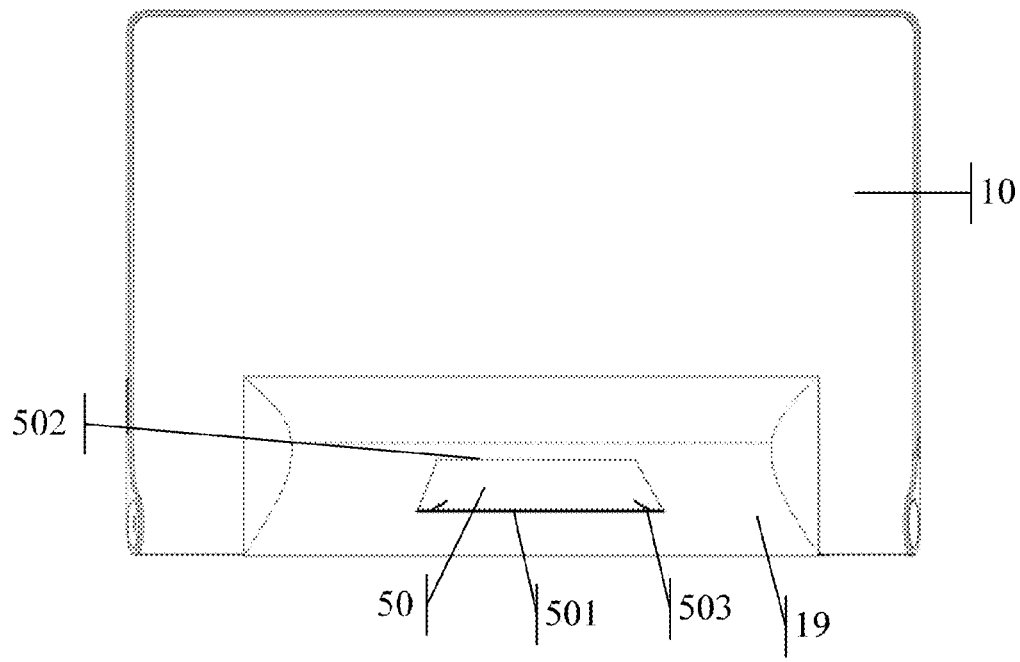
FIG. 8 is a schematic view showing the first groove having a cover plate of the electronic device according to the first embodiment of the present application.

Additionally, referring to FIG. 8, the bottom of the first groove 19 is provided with a cover plate 50. A first side edge 501 of the cover plate 50 is provided with a connecting member 503, the connecting member 503 is an elastomer, and the cover plate 50 is connected to the bottom of the first groove 19 via the connecting member 503.

The cover plate 50 is movable with respect to the bottom of the first groove 19 by taking the connecting member 503 as a shaft. When the cover plate 50 moves to be close to the bottom of the first groove 19, the auxiliary tool of a card-shape may be fixed. The working process of the cover plate 50 is described in detail in conjunction with FIG. 8.

Under the action of the elastomer connecting member 503, the original state of the cover plate 50 and the first groove 19 is that the cover plate 50 abuts against the bottom of the first groove 19 closely. An user may exert an outward force on a second side edge 502 opposite to the first side edge 501 of the cover plate 50, to move the cover plate 50 around the connecting member 503, and then place the card-shaped auxiliary tool to be placed between the cover plate 50 and the bottom of the first groove 19, and when the user withdraws the force on the cover plate, the cover plate 50 may return to its original state under the action of the connecting member 503, thereby fixing the card-shaped auxiliary tool.

The technical solutions according to the above embodiments have at least the following technical effects or advantages.

Since the accommodating space, formed by the first groove arranged on the second surface of the main body of the electronic device, may be used to accommodate auxiliary tools, which effectively solves a technical problem that the electronic device in the prior art is short of accommodating space for accommodating auxiliary tools, and achieves a technical effect that the electronic device may provide the accommodating space for accommodating auxiliary tools by itself.

Since the first groove arranged on the electronic device may accommodate the supporting member, and the bottom of the first groove is provided with the second groove adapted to accommodate the smart card for communication or storage and/or the handwriting pen, the accommodating space formed by the grooves may simultaneously accommodate the supporting member, the smart card, and/or the handwriting pen, and etc., which effectively solves the technical problems in the prior art that the electronic device having an accommodating space has a limited accommodating space, and the types of the auxiliary tools to be accommodated are single, thereby achieving a technical effect that the groove provided on the electronic device has a larger capacity, and the types of the auxiliary tools to be accommodated are variable.

The first shape of the second groove matches with the second shape of the smart card to be accommodated and/or the third shape of the handwriting pen to be accommodated, thus the smart card and/or the handwriting pen may be fixed when being placed in the second groove having the corresponding shape, which effectively solves the technical problem in the prior art that the auxiliary tools placed in the grooves of the electronic device having an accommodating space could not be fixed, and achieves a technical effect that the electronic device may accommodate the auxiliary tools and may also fix the auxiliary tools.

Further, the separating plate is arranged inside the first groove to divide the first groove into multiple first sub-grooves, and also can be assembled and disassembled flexibly. For example, when the separating plate is mounted in the groove, it facilitates the user to place auxiliary tools separately by categories, which effectively prevents the collision among the auxiliary tools; and when the separating plate is removed, the user may place the auxiliary tools having a larger size in the groove. In general, the user can flexibly arrange the layout of the grooves according to the size of auxiliary tools to be placed.

Figure 9:
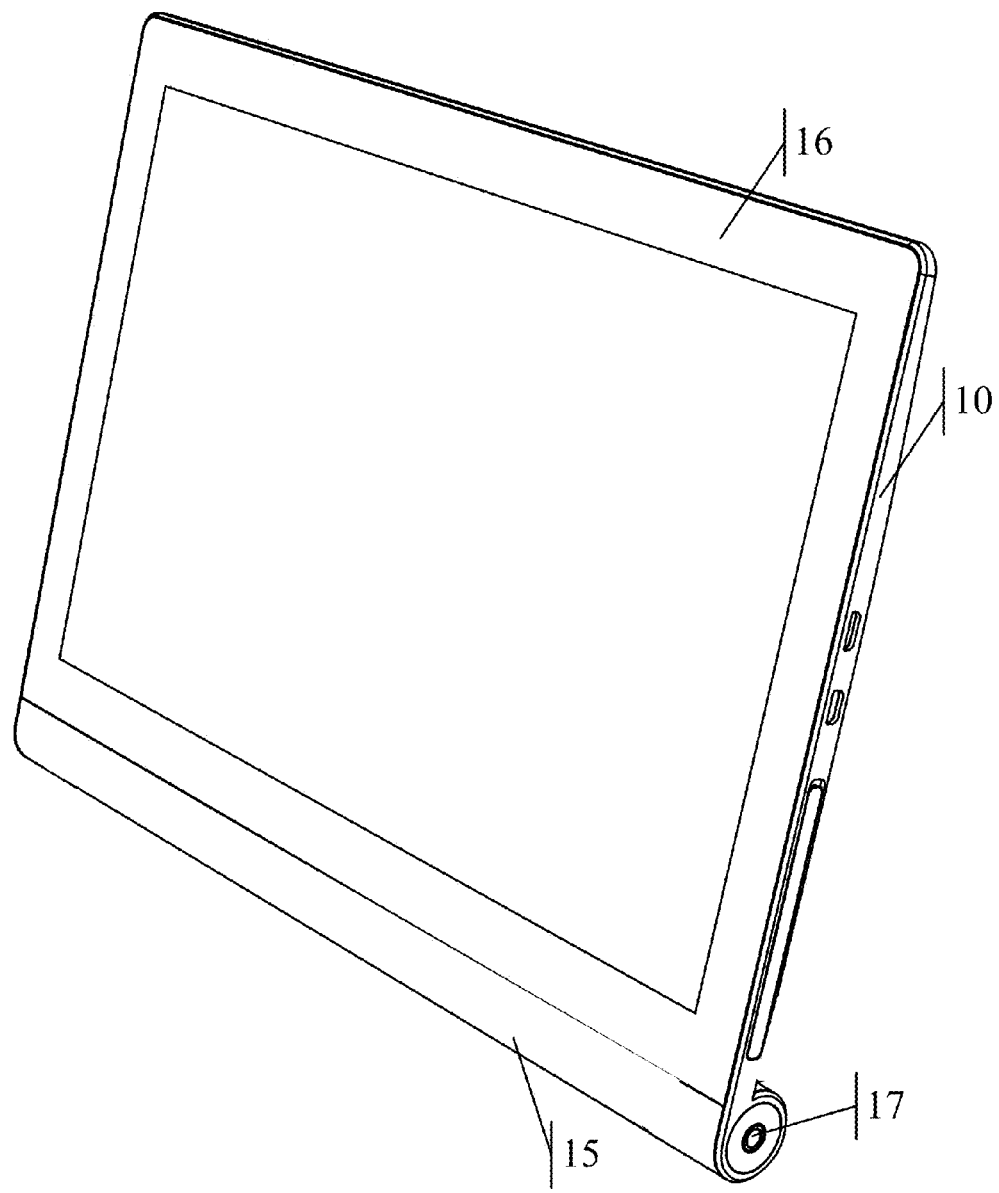
FIGS. 9 and 10 are schematic views of an electronic device according to a second embodiment of the present application.
Figure 10:
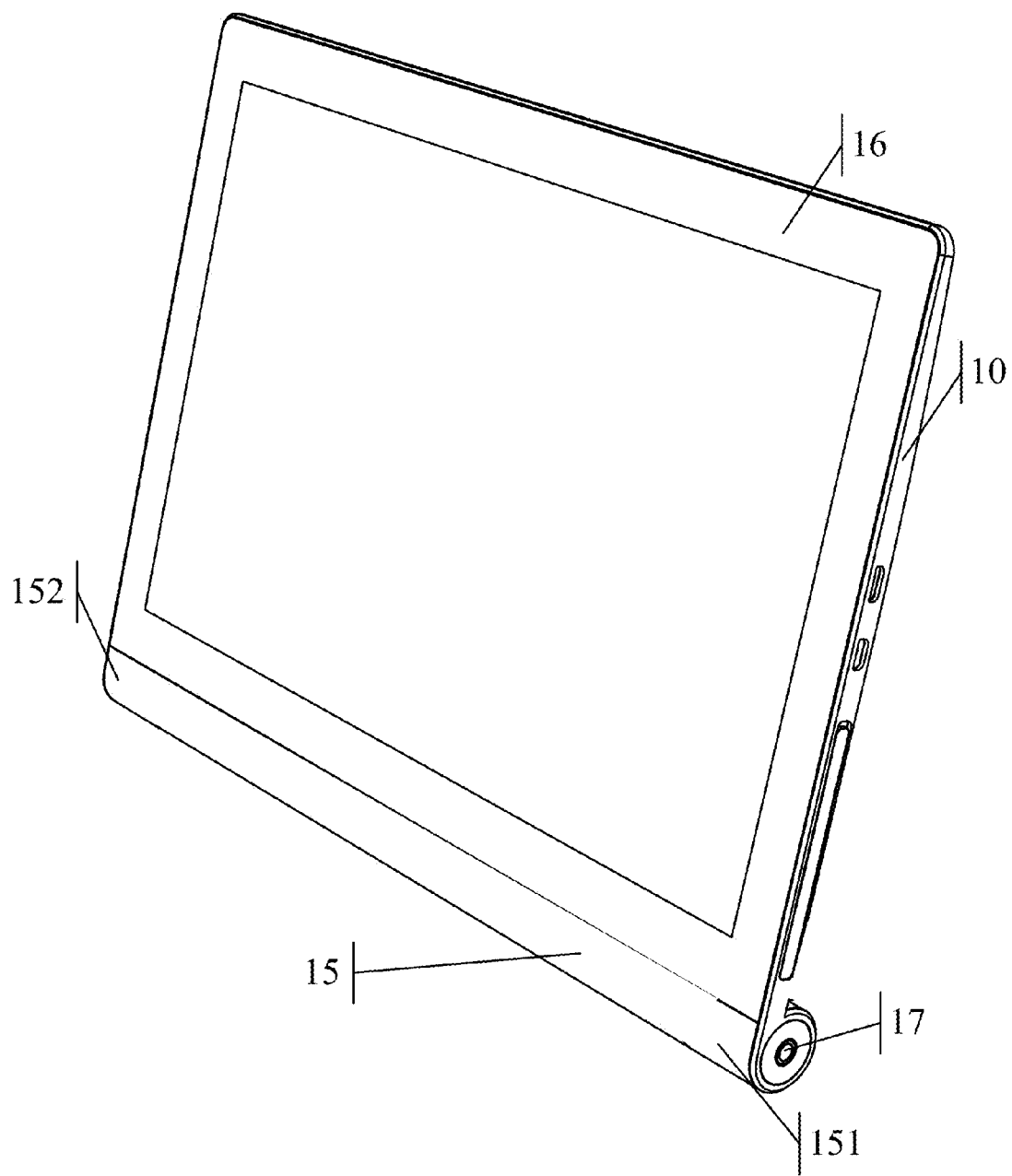

As shown in FIGS. 9 and 10, the electronic device according to the second embodiment of the present application includes a main body 10 and a display unit, the main body 10 includes a first side portion 15 and a second side portion 16, the second side portion 16 may be a side portion opposite to the first side portion 15. A thickness of the main body 10 has a tendency of being smaller in a direction from the first side portion 15 to the second side portion 16. The display unit is arranged on a first surface 11 of the main body 10, and a second surface 12 of the main body 10 is provided with a groove for forming an accommodating space. The electronic device further includes M input/output members 17 arranged on the first side portion 15, and M is a positive integer.

M input/output members 17 are arranged on an end portion of the first side portion 15.

In this embodiment, the electronic device includes the first side portion and the second side portion, the thickness of the main body has a tendency of being smaller in a direction from the first side portion to the second side portion, and the accommodating space formed by the groove provided on the second surface of the main body may be used to accommodate auxiliary tools. Since the thickness of the main body has a tendency of being smaller in a direction from the first side portion to the second side portion, the electronic device does not need other supporting components, and the electronic device could stand just by taking the first side portion as a bottom and taking the second side portion as a top, in this way, the self-support of the electronic device may be achieved without additional supporting components, which effectively solves the technical problem that the electronic device in the prior art could not be supported by itself, thus it is more convenient for users to use the electronic device.

M input/output members 17 are arranged on the end portion of the first side portion 15, and M may be a positive integer. Only one input/output member 17 is shown in FIG. 9, but the number of the input/output members in the present application is not limited to that.

As shown FIG. 9, as an example, an end surface of the first side portion 15 is a curved surface, but the embodiments of the present application are not limited to that, and the end surface of the first side portion 15 may also be a right angled surface, a wedge-shaped surface, and etc.

Preferably, a centre of gravity of the first side portion 15 may be coincided with that of the main body 10, i.e. the centre of gravity of the first side portion 15 and that of the main body 10 may be the same centre of gravity. In this way, the centre of gravity of the main body 10 is located in the first side portion 15 equivalently, which could better ensure that the electronic device may stand via the first side portion 15.

Preferably, for reducing a thickness of the second side portion 16, at least one first functional component arranged inside the main body 10, for example, an element occupying a large space such as a main board, a CPU, a camera module, a loudspeaker, a sound card, a display card, and etc., may be arranged at a position close to the first side portion 15, in this way, the thickness of the main body 10 may be gradually reduced from the first side portion 15 to the second side portion 16, thereby further ensuring that the thickness of the main body 10 has a tendency of being smaller in the direction from the first side portion 15 to the second side portion 16.

Further, referring to FIG. 10, the first side portion 15 may include a first end portion 151 and a second end portion 152. M input/output members 17 may be arranged on an outer surface of the first end portion 151, and/or an outer surface of the second end portion 152.

As shown in FIG. 10, only one input/output member is provided on the outer surface of the first end portion 151, but the number and the location of the input/output members 17 in the present application are not limited to that.

In this embodiment, if M input/output members 17 are arranged on the outer surface of the first end portion 151, preferably, a first input/output member 17 of the M input/output members 17 is concentric with the outer surface of the first end portion 151, i.e. the first input/output member 17 has the same center as the cross section of the first end portion 151.

Figure 11:
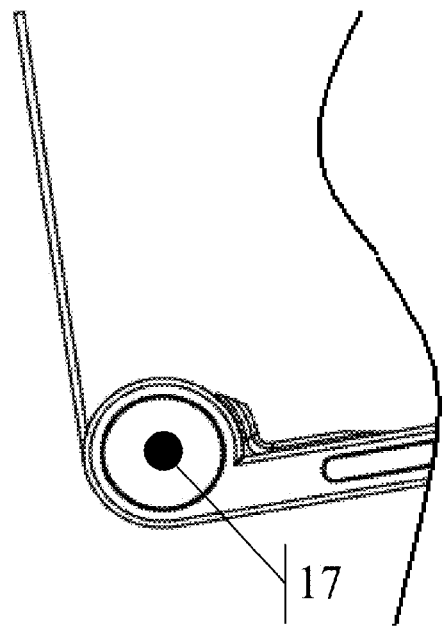
FIGS. 11 and 12 are side views of a first side portion of the electronic device according to the second embodiment of the present application.

For example, as shown in FIG. 11, the shape of the cross section of the first end portion 151 is circular, and the shape of the cross section of the first input/output member 17 is also circular, and the above two circulars may have the same centre, i.e. the two circulars may be concentric circles.

Figure 12:
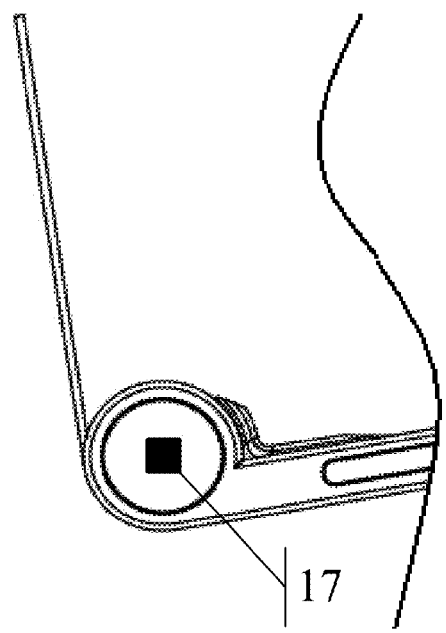
Figure 13:
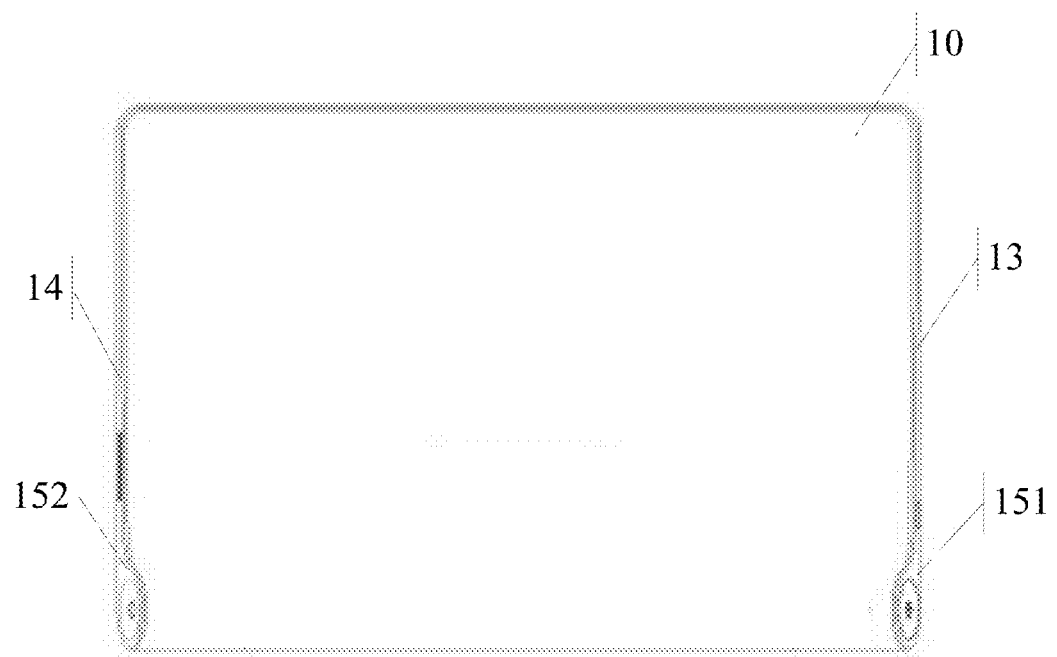
FIG. 13 is a rear view of the electronic device according to the second embodiment of the present application.

For example, as shown in FIG. 12, the shape of the cross section of the first end portion 151 is circular, and the shape of the cross section of the first input/output member 17 is square, and the above two shapes may have the same centre.

The electronic device may look more beautiful when the first input/output member 17 and the outer surface of the first end portion 151 have the same centre.

Similarly, if the M input/output members 17 are arranged on an outer surface of the second end portion 152, preferably, the first input/output member 17 of the M input/output members 17 is concentric with the outer surface of the second end portion 152, i.e. the first input/output member 17 has the same center as the cross section of the second end portion 152.

Preferably, since the first end portion 151 and the second end portion 152 may have the same centre, the first input/output member 17 has the same center as the outer surface of one end portion may refer to that the first input/output member 17 is arranged on the outer surface of this end portion, or the first input/output member 17 is arranged on the outer surface of the other end portion opposite to this end portion.

As shown in FIGS. 11 and 12, the structure is described by taking an example that the first input/output member 17 is arranged on the outer surface of the corresponding end portion.

Preferably, if the first input/output member 17 and the outer surface of the first end portion 151 have the same centre, the shape of the first input/output member 17 may be same as that of the outer surface of the first end portion 151.

Preferably, if the first input/output member 17 and the outer surface of the second end portion 152 have the same centre, the shape of the first input/output member 17 may be same as that of the outer surface of the second end portion 152.

Preferably, if the first input/output member 17 has the same center with both the outer surface of the first end portion 151 and the outer surface of the second end portion 152, the shape of the first input/output member 17 may be same as the shape of both the outer surface of the first end portion 151 and the outer surface of the second end portion 152. At this time, the shape of the outer surface of the first end portion 151 may be same as that of the second end portion 152.

Further, for moving the centre of gravity of the electronic device rearwards and downwards so as to firmly support the electronic device via the first side portion 15, an angle may be formed between the outer surface of the first end portion 151 and the first side surface 13 of the main body 10, as shown in FIG. 10 which is a rear view of the main body 10. Certainly, an angle may also be formed between the outer surface of the first end portion 151 and the second side surface 14 of the main body 10, and the two angles may has the same value.

Preferably, the angle may be larger than a threshold, such as 3 degree, 5 degree, 10 degree, and etc., thus the outer surfaces of the first end portion 151 and the second end portion 152 and the second surface 12 of the main body 10 may be observed by the user at the same time. In other words, a thickness of the first side portion decreases in a direction from the first surface to the second surface to permit the outer surface of the first end portion, the outer surface of the second end portion, and the second surface of the main body to be observed by a user at the same time.

Figure 14:
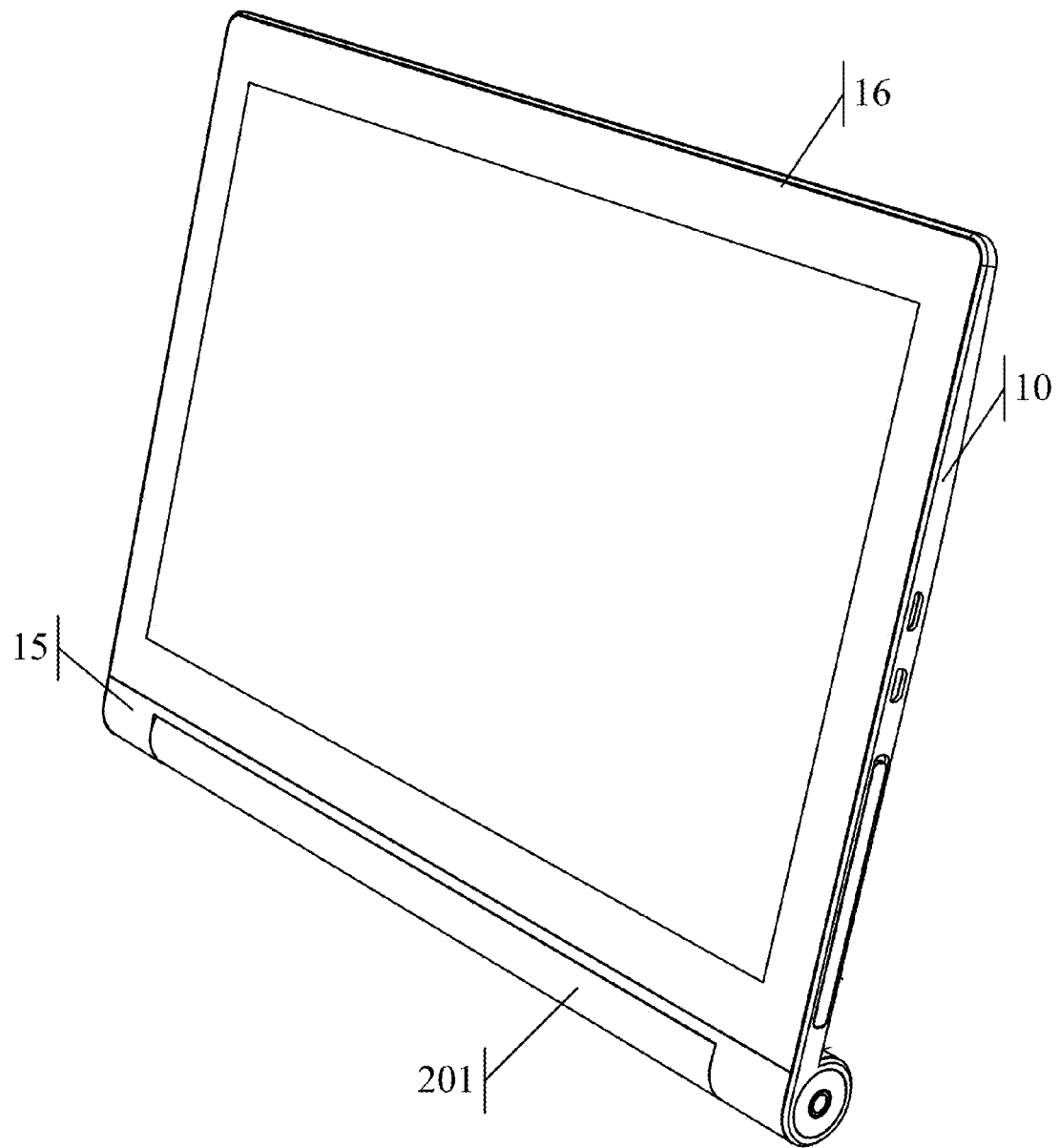
FIGS. 14 to 17 are schematic views showing the structure of the electronic device according to the second embodiment of the present application.

Preferably, the electronic device further includes a supporting member, and the supporting member is arranged at the first side portion 15 having a larger thickness, and may include a connecting member 201, as shown in FIG. 14.

Preferably, the electronic device further includes N input/output members 17, and the N input/output members 17 may be arranged on an end surface of the connecting member 201, and/or on a first surface 153 of the first side portion 15.

Figure 15:
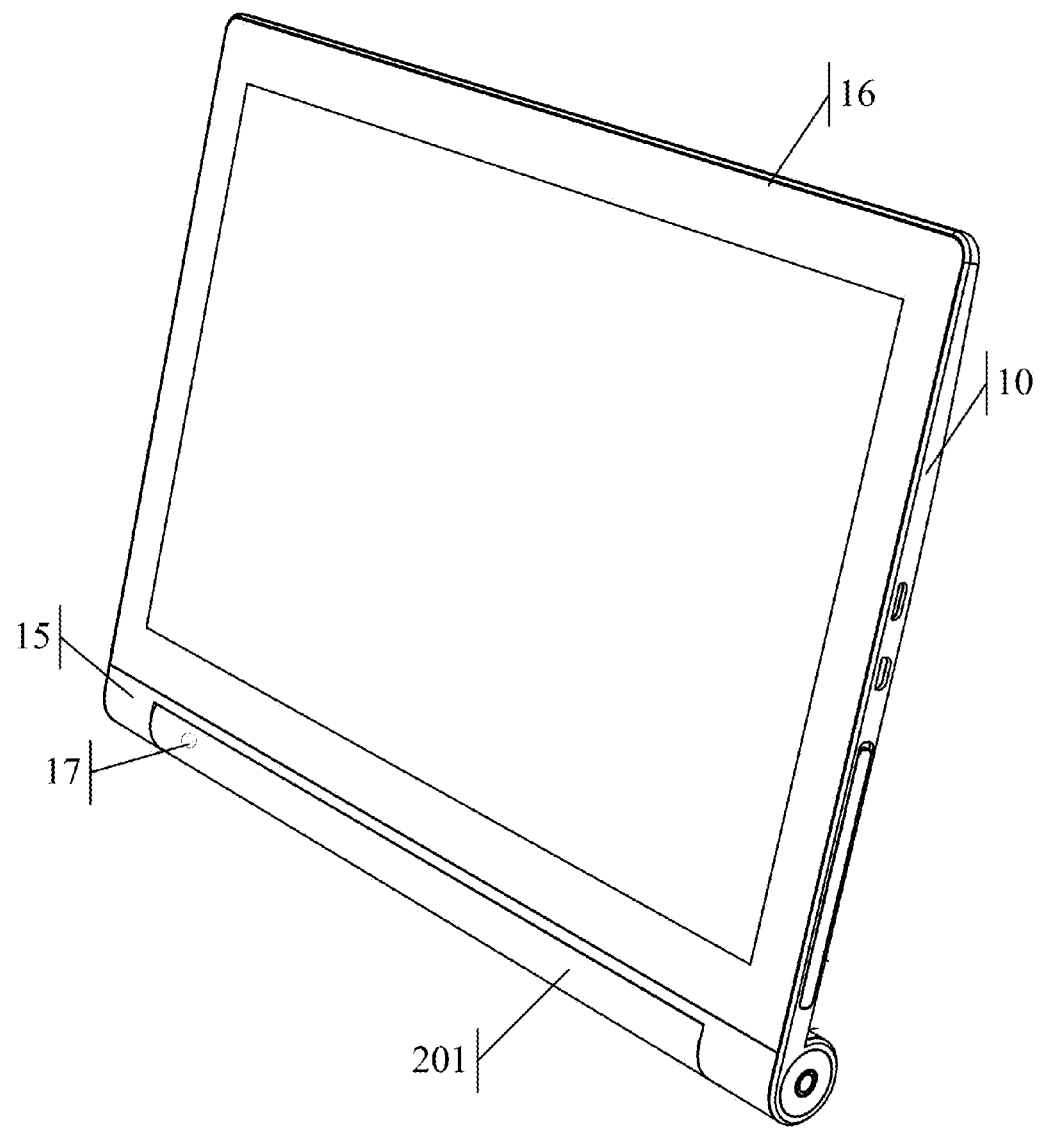
Figure 16:
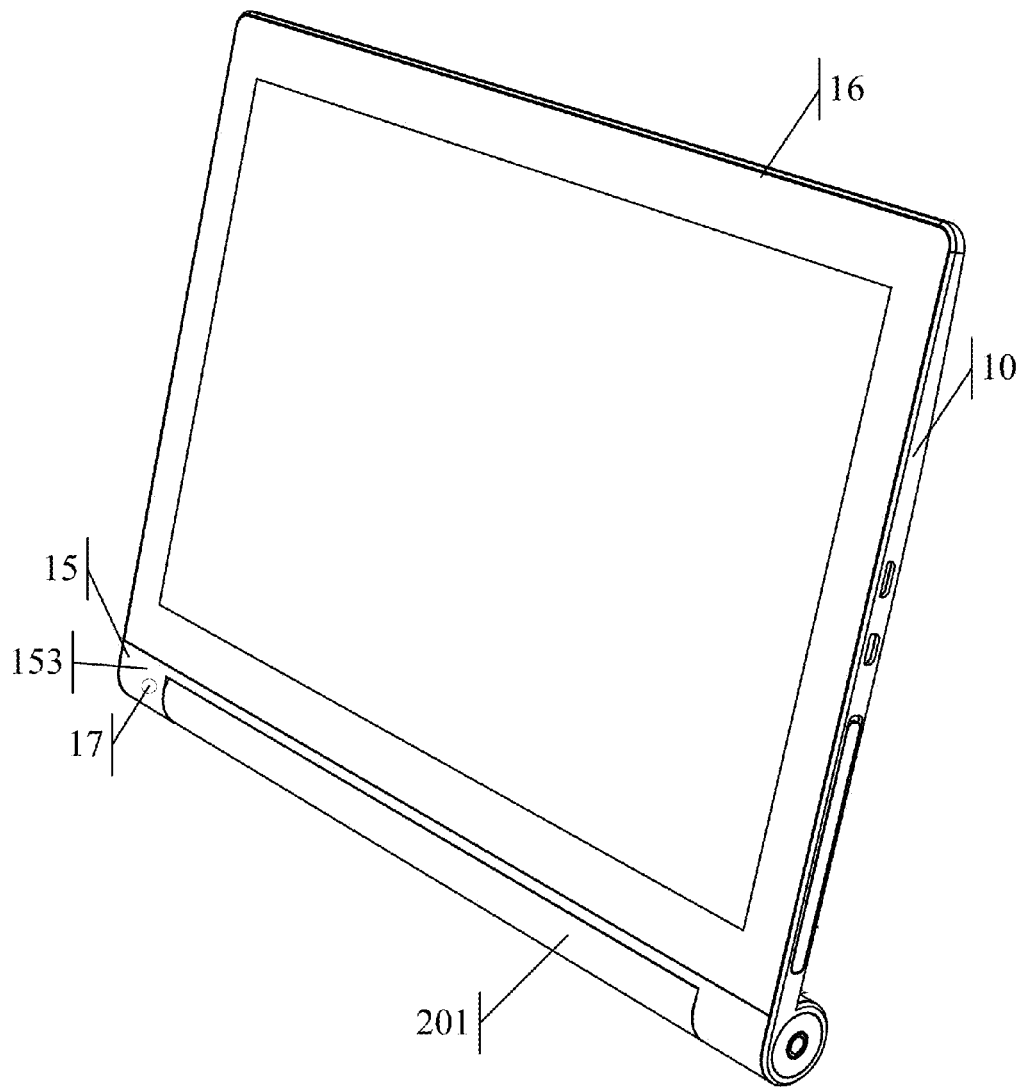

Reference is made to FIGS. 15 and 16, FIG. 15 is a schematic view showing the N input/output members 17 being arranged on the end surface of the connecting member 201, and FIG. 16 is a schematic view showing the N input/output members 17 being arranged on the first surface 153 of the first side portion 15. As an example, N is 1 in FIGS. 15 and 16, and as an example, the shape of the input/output member 17 is circle in FIGS. 7 and 8.

Figure 17:
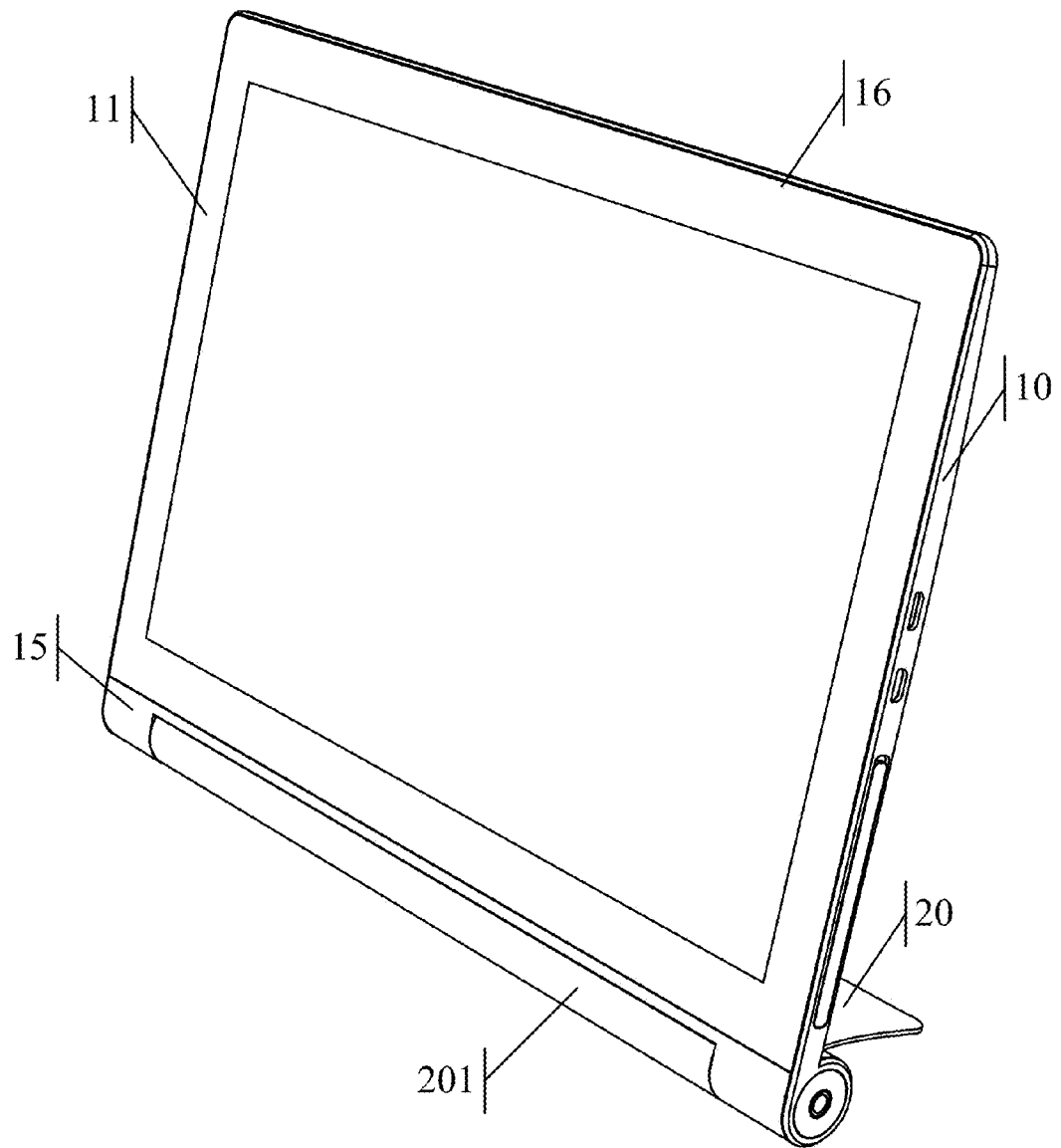

Preferably, as shown in FIG. 17, the supporting member may further include a supporting plate 20.

The supporting plate 20 is movable with respect to the main body 10 via the connecting member 201, and when moving to a first relative position with respect to the main body 10, the supporting plate 20 may support the main body 10.

In this embodiment, due to the supporting plate 20, the electronic device may stand more firmly, thus it is convenient for users to use the electronic device.

In this embodiment, the input/output member 17 may be a functional unit, such as a key, an indicating lamp, a loudspeaker, a camera, a periphery interface and so on.

In this embodiment, the M input/output members 17 may be any one or various combinations of keys, indicating lamps, loudspeakers, cameras and periphery interfaces.

In this embodiment, the N input/output members 17 may be any one or various combinations of keys, indicating lamps, loudspeakers, cameras and periphery interfaces.

In this embodiment, referring to FIG. 17, the supporting member may include a connecting member 201 and a supporting plate 20. The supporting plate 20 and the connecting member 201 may be formed integrally. Or the supporting plate 20 is sleeved on the connecting member 201, and the supporting plate 20 and the connecting member 201 are fixedly connected, that is when the connecting member 201 moves, the supporting plate 20 may move along with the connecting member 201.

Figure 18:
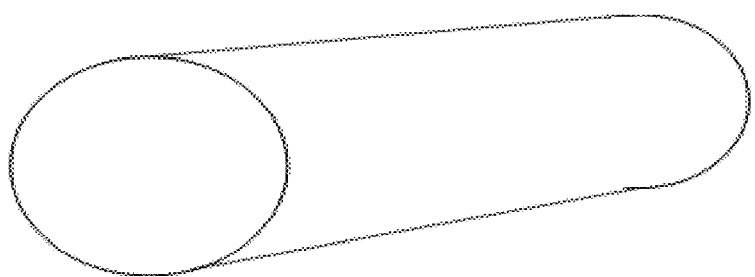
FIGS. 18 and 19 are schematic views showing the structure of a connecting member of the electronic device according to the second embodiment of the present application.
Figure 19:
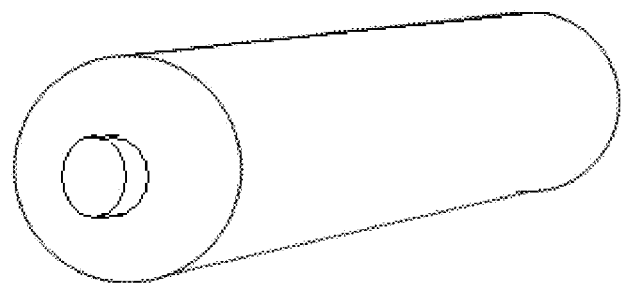

The connecting member 201 may be a rotating shaft as shown in FIG. 18, or may also consist of multiple rotating shafts with different diameters. Preferably, for remaining the supporting plate 20 in the first relative position to support the main body 10 when the supporting plate 20 moves to the first relative position with respect to the main body 10, the connecting member 201 may be a damping rotating shaft, in this way, the supporting plate 20 may stop at any position to support the main body 10.

According to this embodiment, the electronic device includes the first side portion and the second side portion, and the accommodating space formed by the groove provided on the second surface of the main body may be used to accommodate auxiliary tools. Since the thickness of the main body has a tendency of being smaller in a direction from the first side portion to the second side portion, the electronic device does not need other supporting components, and the electronic device could stand just by taking the first side portion as a bottom and taking the second side portion as a top, in this way, the self-support of the electronic device may be achieved without additional supporting components, which on a basis of providing the accommodating space for accommodating auxiliary tools, effectively solves the technical problem that the electronic device in the prior art could not be supported by itself, thus it is more convenient for users to use the electronic device.

Figure 20:
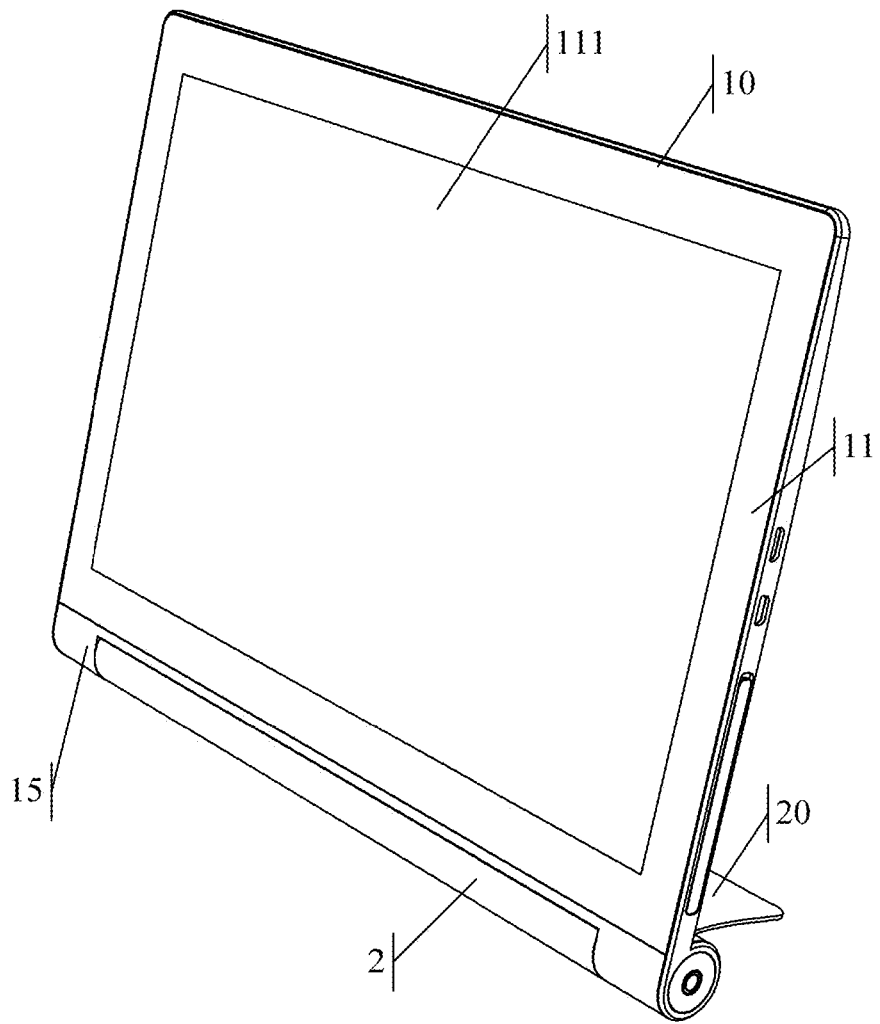
FIGS. 20 and 21 are schematic views showing the structure of the electronic device according to a third embodiment of the present application.
Figure 21:
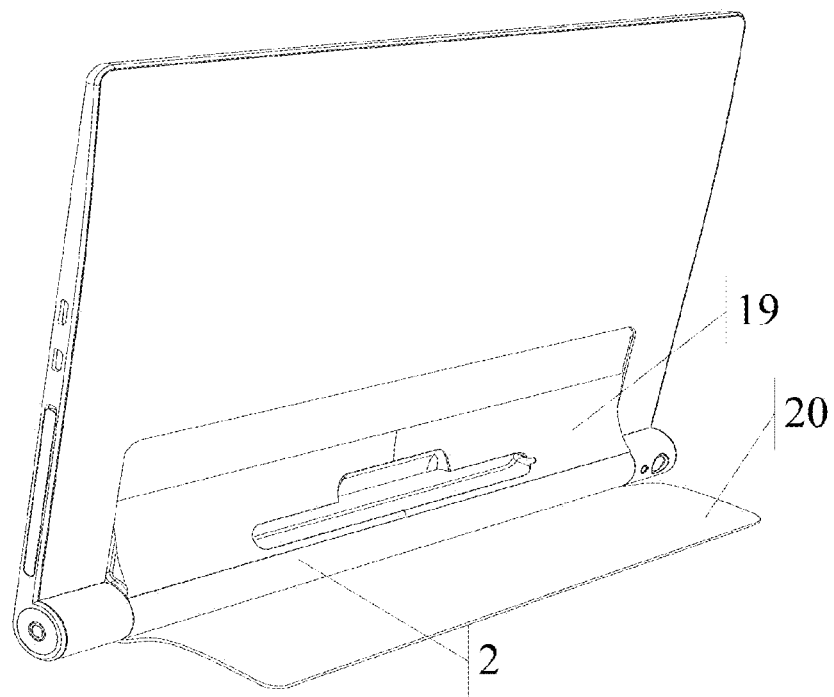

As shown in FIG. 20, the electronic device according to the third embodiment of the present application includes a main body 10 and a display unit 111. The main body 10 includes a first side portion 15 and a second side portion 16, and the second side portion 16 is a side portion opposite to the first side portion 15. A thickness of the main body 10 has a tendency of being smaller in a direction from the first side portion 15 to the second side portion 16. The display unit 111 is arranged on a first surface 11 of the main body 10, and a second surface 12 of the main body 10 is provided with a first groove 19 for forming an accommodating space. The electronic device further includes a shaft 2 for connecting a supporting member to the main body 10, and a supporting plate 20 for supporting the main body 10. A first side edge 203 of the supporting plate 20 is provided with a mounting hole 204, and the supporting plate 20 is sleeved on the shaft 2 via the mounting hole 204. Since the shaft 2 is provided on the main body 10 of the electronic device and the supporting plate 20 is sleeved on the shaft 2, the supporting plate 20 is movable with respect to the shaft 2, which may change the relative position between the supporting plate 20 and the main body 10, thus the supporting plate 20 may support the electronic device at different angles, therefore the electronic device may achieve the self-support by its own structure on a basis of providing an accommodating space for the auxiliary tools, and it is convenient for users to use the electronic device.

The display unit 111 of the main body 10 may be arranged on the first surface 11 of the main body 10 by embedding. In this embodiment, the display unit 111 may be an ordinary LED display screen, and also be a touch display screen, a flexible screen, and other display units having the displaying function, which will not be limited herein. A user may browse the web, watch news and movies, or send and receive emails, via the display unit 111.

In this embodiment, besides that the display unit 111 is arranged on the first surface 11 of the main body 10, any one or more input/output devices, such as a speaker box, a camera, a button, an indicating lamp, a USB port, may be further arranged on the main body 10. For example, the camera may be arranged at the edge of the display unit 111 on the first surface; certainly, two cameras may also be provided, with one camera on the first surface, and the other camera on the second surface. The locations of the speaker box, the button, the indicating lamp, the USB port may be set by the persons skilled in the art based on actual requirements, which will not be illustrated herein one by one, and will not be limited herein.

Figure 23:
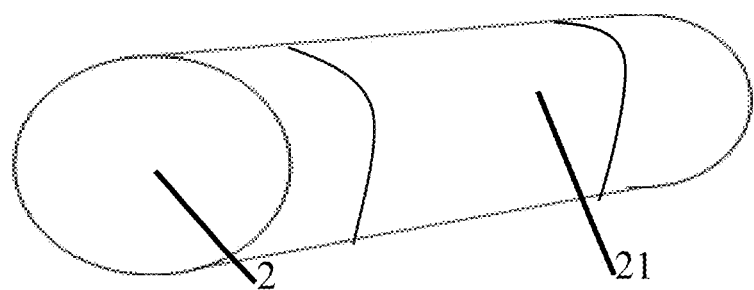
FIGS. 23 and 24 are schematic views showing the structure of a shaft of the electronic device according to the third embodiment of the present application.
Figure 24:
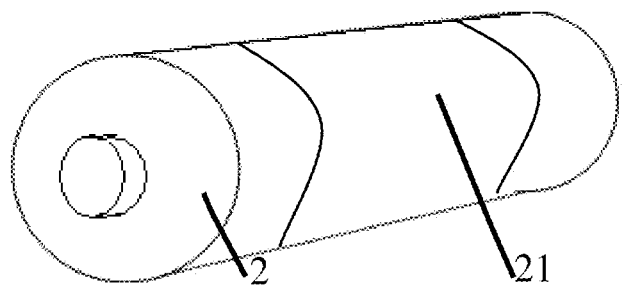

In this embodiment, the shaft 2 may be arranged on the first side portion 15 of the main body 10. The shaft 2 may be an integral shaft as shown in FIG. 23, and also may consist of multiple sub-shafts with different diameters as shown in FIG. 24. When the shaft 2 is the integral shaft as shown in FIG. 23, the shaft 2 is simple to manufacture and has a low cost. When the shaft 2 consists of multiple sub-shafts with different diameters as shown in FIG. 24, since the multiple sub-shafts have different diameters, the sub-shaft having a smaller diameter in the multiple sub-shafts with different diameters is connected to or nested with the corresponding connecting end portion of the main body 10 of the electronic device in a rotating process, therefore the shaft 2 is not easy to fall off in the rotating process. In practical application, the persons skilled in the art may choose the solution shown in FIG. 23 or the solution shown in FIG. 24 based on actual requirements, which will not be limited herein.

Figure 22:
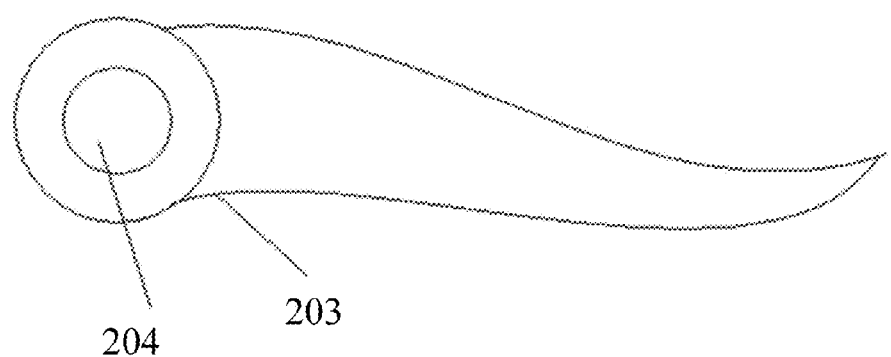
FIG. 22 is a schematic view showing the structure of a supporting member of the electronic device according to the third embodiment of the present application.

The supporting plate 20 of the electronic device according to this embodiment is mainly used to support the main body 10. In one solution, as shown in FIG. 22, at least one surface of the supporting plate 20 may be a plane or a curved surface. When at least one surface of the supporting plate 20 is the curved surface, if the supporting plate 20 is placed on a plane, such as a desktop, there are at least two contact surfaces between the supporting plate 20 and the desktop, thus the supporting plate 20 may provide a large support force for the main body 10. When at least one surface of the supporting plate 20 is a plane, if the supporting plate 20 is placed on a plane, such as a desktop, there are only one contact surface between the supporting plate 20 and the desktop, thus the support force for the main body 10 provided by the supporting plate 20 is small, and the electronic device in using may slide under the action of its own gravity or an external thrust force.

In the technical solution of this embodiment, for connecting the supporting plate 20 to the shaft 2 to further connect the main body 10 to the supporting plate 20, the first side edge 203 of the supporting plate 20 is provided with the mounting hole 204, as shown in FIG. 22. In this embodiment, the mounting hole 204 is a through hole, and for ensuring that the supporting plate 20 can be sleeved on the shaft 2, an inner diameter of the mounting hole 204 is required to be equal to or greater than a diameter of the shaft 2. Certainly, the mounting hole 204 may be a half-arc hollow cylinder or a three-quarter-arc hollow cylinder, and the shape of the mounting hole 204 may be set by the persons skilled in the art according to actual requirements, which will not be limited herein.

In this embodiment, for facilitating an user adjusting an inclination of the screen according to actual requirements when watching the display unit 111 of the electronic device, an angle between the supporting plate 20 and the shaft 2 is required to be variable in a certain range, such as in a range of 0 degree to 90 degree. At the same time, for facilitating carrying the electronic device, the supporting plate 20 is required to be foldable when it is no need to support the electronic device, and in the present application, the supporting plate 20 is movable with respect to the shaft 2, and the rotating range of the supporting plate 20 with respect to the shaft 20 is within an angle range, such as in a range from 0 degree to 90 degree, or in a range from 0 degree to 80 degree, and the range may be set by the persons skilled in the art according to actual requirements, which will not be limited herein.

In the embodiments of the present application, for facilitating the users watching the display unit 111, an inclination is required to be provided between the supporting plate 20 and the plane adapted to place the electronic device when the electronic device is supported by the supporting plate 20, and in this embodiment, the shaft 2 is arranged at the first side portion 15 of the main body 10, thus the supporting plate 20 is connected to the first side portion 15 of the main body 10.

In this embodiment, in order to ensure that the main body 10 may be supported by the supporting plate 20, a damping structure 21 is provided on the shaft 2 to increase a friction between the shaft 2 and the supporting plate 20, thus when supporting the main body 10, the supporting plate 20 may overcome the gravity of the main body 10 to firmly support the main body 10, which may prevent the main body 10 being supported from falling off suddenly, thereby avoiding the physical damage to the electronic device.

In this embodiment, the damping structure 21 is a damping block made of rubber materials having a damping coefficient greater than a preset value, for example, the damping block is a rectangular damping block made of rubber materials having a damping coefficient greater than 1.01 and stuck onto the surface of the shaft 2, or the damping structure 21 is damping oil coated on the surface of the shaft.

For further increasing the friction between the supporting plate 20 and the shaft 2 to enable the supporting plate 20 to firmly support the main body 10, an inner surface, matching with the shaft 2, of the first side edge 203 of the supporting plate 20 is made of damping materials. The inner surface may be made of rubber materials, or plastic materials, for example rubber materials or the plastic materials having a damping coefficient being 1.01, and the materials of the inner surface may be set by the persons skilled in the art according to actual requirements, which will not be limited herein.

The cooperation or position relationships among each components of the electronic device in the using process are described in detail as follows in conjunction with specific application situations, by taking an example with the electronic device being a flat panel computer.

Figure 25:
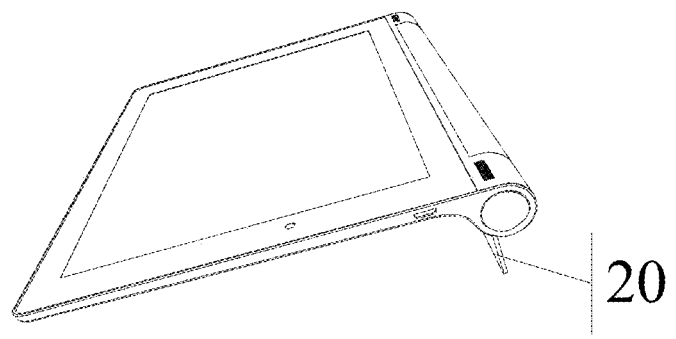
FIG. 25 is a schematic view showing a first usage mode of the electronic device according to the third embodiment of the present application.

Firstly, if a user wants to increase the inputting efficiency when editing a document or entering texts with the electronic device, the user may type on a virtual keyboard of the electronic device with both hands, and at this time, the electronic device is in a first usage mode, i.e. an input mode. As shown in FIG. 25, the user may put the first side portion 15 of the main body 10 at a position away from the user, unfold the supporting plate 20, and rotate the supporting plate 20 with respect to the shaft 2 to any position required by the user, such as at 90 degree. Due to the damping effect of the damping structure 21, the friction between the shaft 2 and the supporting plate 20 is increased, thus the supporting plate 20 may support the gravity of the main body 10, and the main body 10 and the supporting plate 20 may be remained at the above position, for example at 90 degree. In the first usage mode, the electronic device may adjust the displaying direction of the display unit 11 according to its own state, thereby facilitating inputting for the user.

Figure 26:
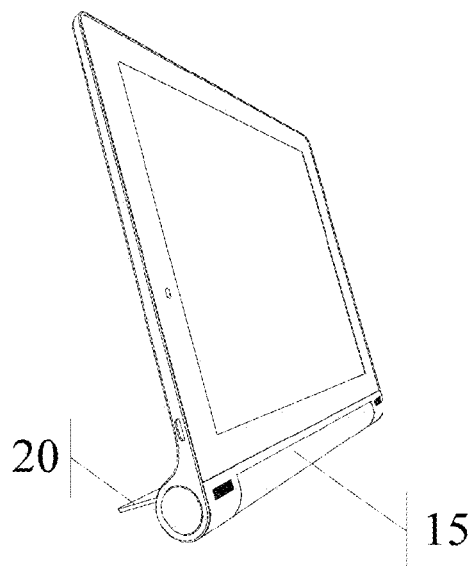
FIG. 26 is a schematic view showing a second usage mode of the electronic device according to the third embodiment of the present application.

When the user wants to watch videos or browse the web, the user may change the electronic device from a flat plate mode to a standing mode, i.e. a second usage mode. The user only needs to unfold the supporting plate 20, and rotate the supporting plate 20 with respect to the shaft 2 till the angle formed between the supporting plate 20 and the main body 10 has a value required by the user, such as 60 degree. Due to the damping effect of the damping structure 21, the friction between the shaft 2 and the supporting plate 20 is increased, thus the supporting plate 20 may support the gravity of the main body 10, and the main body 10 and the supporting plate 20 may be remained at the above position, for example at 60 degree. At this time, as shown in FIG. 26, the electronic device is in the second usage mode, i.e. the standing mode, and the whole electronic device is supported by the supporting plate 20 and the first side portion 15 of the main body 10. In the standing mode, the user may watch videos or browse the web with the electronic device.

Figure 27:
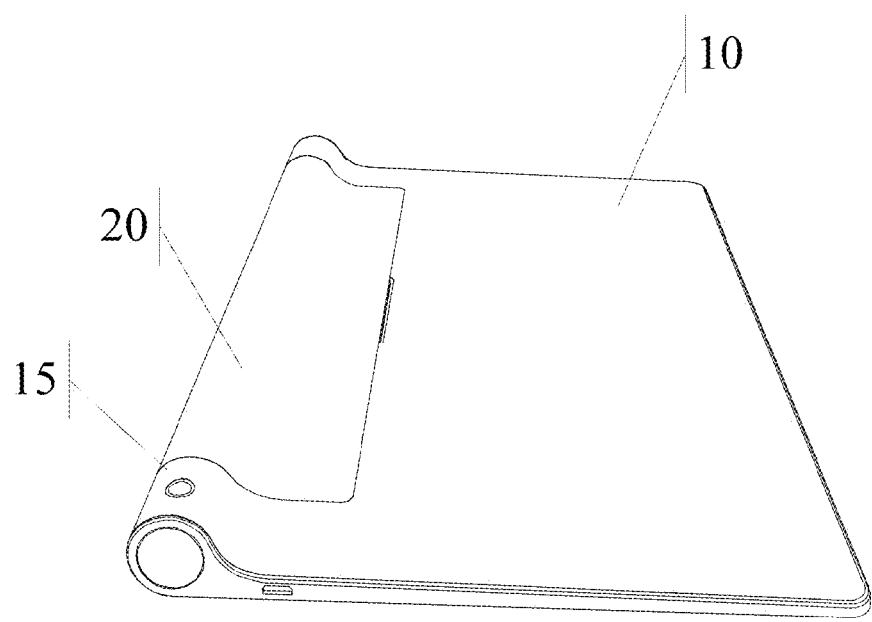
FIG. 27 is a schematic view showing a third usage mode of the electronic device according to the third embodiment of the present application.

As shown in FIG. 27, in a third usage mode, i.e. the flat plate mode, the supporting plate 20 is folded to the back of the main body 10 of the electronic device, that is the supporting plate 20 abuts against the back of the display unit 11 to form an integral plane. At this time, the user may hold the electronic device as using a common flat panel computer, or may place the electronic device on the plane to enter texts, browse photos, edit documents, and make other operations.

The technical solution of the above embodiment has at least the following technical effects or advantages.

The accommodating space formed by the first groove arranged on the second surface of the electronic device may be used to accommodate auxiliary tools, thus the electronic device may provide the accommodating space for the auxiliary tools by itself. Further, since a shaft is arranged on the first side portion of the main body of the electronic device and the supporting plate is sleeved on the shaft and is movable with respect to the shaft, the relative position between the supporting plate and the main body may be changed, thus the supporting plate may support the electronic device at different angles, thus on a basis of providing accommodating space for the auxiliary tools by its own structure, the electronic device according to the present application further solves the technical problem that the electronic device in the prior art can not be supported by its own structure, and realizes the self-support by its own structure.

Since the damping structure is provided on the shaft of the electronic device, the damping structure may increase the friction between the shaft and the supporting member when the electronic device is supported by the supporting member, thus the supporting member may overcome the gravity of the electronic device, thereby ensuring that the main body will not slide down during the using process of the electronic device being supported, and avoiding the physical damage to the electronic device and achieving the technical effect of fixedly supporting the electronic device.

Since the supporting member is sleeved on the shaft via the mounting hole of the first side edge, the supporting member is movable with respect to the shaft, thus the user may rotate the supporting member to support the electronic device at different positions according to actual requirements, and the electronic device may be used in different states, thereby improving the using experience.

Since the supporting member is provided on the electronic device, the user does not need to purchase a support bracket additionally, and does not need to worry about that the support bracket is inconvenient to carry, thereby effectively solving the technical problem that the electronic device in the prior art has a high use cost and is inconvenient to use, and reducing the cost and facilitating carrying the electronic device.

The embodiments described hereinabove are only exemplary embodiments of the present application, and it should be noted that, for the person skilled in the art, many modifications and improvements may be made to the present application without departing from the principle of the present application. The protection scope of the present application is defined by the claims.

What is claimed is:

1. An electronic device, comprising:
a main body comprising a first side portion and a second side portion, the first side portion including a first end portion and a second end portion, the second side portion being a side portion opposite to the first side portion, and a thickness of the main body having a tendency of being smaller in a direction from the first side portion to the second side portion; and
a display unit arranged on a first surface of the main body;
wherein a first groove is arranged on a second surface of the main body to form an accommodating space, the second surface being opposite to the first surface of the main body; and
wherein an outer surface of the first end portion and a first side surface of the main body form an angle and an outer surface of the second end portion and a second side surface of the main body form an angle greater than a threshold such that a thickness of the first side portion decreases in a direction from the first surface to the second surface to permit the outer surface of the first end portion, the outer surface of the second end portion, and the second surface of the main body to be observed by a user at the same time;
wherein the first side portion is provided with M input/output members, and M is a positive integer, and the M input/output members comprise any one or various combinations of an indicating lamp, a loudspeaker, and a periphery interface, and at least one input/output member of the M input/output members on the first side portion is provided on the first surface of the main body to permit the at least one input/output member and the display unit to be observed by the user at the same time.

2. The electronic device according to claim 1, further comprising a supporting plate movable with respect to the main body.

3. The electronic device according to claim 2, wherein, the first groove is adapted to accommodate the supporting plate.

4. The electronic device according to claim 1, wherein, the accommodating space is adapted to accommodate a smart card for communication or storage and/or a handwriting pen.

5. The electronic device according to claim 1, wherein, the first groove is provided with a second groove, and the second groove is adapted to accommodate a smart card for communication or storage and/or a handwriting pen.

6. The electronic device according to claim 5, wherein, the second groove has a first shape matching with a second shape of the smart card to be accommodated and/or a third shape of the handwriting pen to be accommodated.

7. The electronic device according to claim 1, wherein, the accommodating space is adapted to accommodate a power source of the electronic device.

8. The electronic device according to claim 1, wherein, a bottom of the first groove is provided with a cover plate, a first side edge of the cover plate is provided with a connecting member, the connecting member is an elastomer, and the cover plate is connected to the bottom of the first groove via the connecting member;
wherein, the cover plate is movable with respect to the bottom of the first groove by taking the connecting member as a shaft, and in a case that the cover plate moves to be close to the bottom of the first groove, a card-shaped auxiliary tool is fixed by the cover plate.

9. The electronic device according to claim 1, wherein, the M input/output members further comprises input/output members arranged on the first and second end portions of the first side portion.

10. The electronic device according to claim 1, wherein, the M input/output members further comprises input/output members arranged on the outer surface of the first end portion and/or the outer surface of the second end portion.

11. The electronic device according to claim 10, wherein, a first input/output member of the M input/output members has the same center as the first end portion and/or the second end portion.

12. The electronic device according to claim 11, wherein, the first input/output member has a shape same as the outer surface of the first end portion, and/or, the first input/output member has a shape same as the outer surface of the second end portion.

13. The electronic device according to claim 9, further comprising a supporting member, wherein the supporting member comprises a connecting member, and the supporting member is arranged at the first side portion.

14. The electronic device according to claim 13, further comprising N input/output members, and the N input/output members are arranged on an end surface of the connecting member.

15. The electronic device according to claim 13, wherein, the supporting member further comprises a supporting plate, the supporting plate is movable with respect to the main body via the connecting member, and the supporting body is adapted to support the main body in a case that the supporting plate moves to a first relative position with respect to the main body.

16. The electronic device according to claim 1, wherein, the first side portion and the main body have the same center of gravity.

17. The electronic device according to claim 1, wherein, at least one first functional component is arranged inside the main body, and the at least one first functional component is arranged at a position close to the first side portion, and the thickness of the main body has the tendency of being smaller in a direction from the first side portion to the second side portion.

18. The electronic device according to claim 1, further comprising a shaft, and a supporting plate adapted to support the main body, wherein,
   a mounting hole is provided on a first side edge of the supporting plate, and the supporting plate is connected to the shaft via the mounting hole.

19. The electronic device according to claim 18, wherein, the supporting plate is movable with respect to the shaft.

20. The electronic device according to claim 19, wherein, at least one surface of the supporting plate is a curved surface.

21. The electronic device according to claim 18, wherein, the shaft is arranged on the first side portion of the main body.

22. The electronic device according to claim 18, wherein, a value of an inner diameter of the mounting hole is a first value, a value of a diameter of the shaft is a second value, and the first value is greater than or equal to the second value.

23. The electronic device according to claim 18, further comprising a damping structure provided on the shaft.

* * * * *